United States Patent [19]

Christophorou et al.

[11] 4,201,692

[45] May 6, 1980

[54] GAS MIXTURES FOR GAS-FILLED PARTICLE DETECTORS

[75] Inventors: Loucas G. Christophorou, Oak Ridge; Dennis L. McCorkle; David V. Maxey, both of Knoxville; James G. Carter, Oak Ridge, all of Tenn.

[73] Assignee: The United States of America as represented by the United States Department of Energy, Washington, D.C.

[21] Appl. No.: 5,263

[22] Filed: Jan. 22, 1979

[51] Int. Cl.[2] .......................... C09K 3/00; H01J 39/28; H01J 39/30

[52] U.S. Cl. ...................................... 252/372; 250/374

[58] Field of Search .......................................... 252/372

[56] References Cited

PUBLICATIONS

Breyer, Nuclear Inst. and Methods 112, pp. 91–93, 1973.

Moe et al., J. Phys. Chem., 61 422–425, 1957.

Alkhazov et al., Nuclear Inst. & Methods 48, pp. 1–12, 1967.

Olson, J. Chem. Phys. 39, No. 11, 1963, pp. 2902–2908.

*Primary Examiner*—Howard T. Mars

*Attorney, Agent, or Firm*—R. V. Lupo; Stephen D. Hamel; Louis M. Deckelmann

[57] ABSTRACT

Improved binary and tertiary gas mixtures for gas-filled particle detectors are provided. The components are chosen on the basis of the principle that the first component is one gas or mixture of two gases having a large electron scattering cross section at energies of about 0.5 eV and higher, and the second component is a gas (Ar) having a very small cross section at and below aout 0.5 eV, whereby fast electrons in the gaseous mixture are slowed into the energy range of about 0.5 eV where the cross section for the mixture is small and hence the electron mean free path is large. The reduction in both the cross section and the electron energy results in an increase in the drift velocity of the electrons in the gas mixtures over that for the separate components for a range of E/P (pressure-reduced electron field) values. Several gas mixtures are provided that provide faster response in gas-filled detectors for convenient E/P ranges as compared with conventional gas mixtures.

5 Claims, 3 Drawing Figures

GAS MIXTURES FOR GAS-FILLED PARTICLE DETECTORS

BACKGROUND OF THE INVENTION

This invention was made in the course of, or under, a contract with the U.S. Department of Energy.

Gas-filled detectors have been used extensively in radiation detection and dosimetry. In such detectors the radiation interacts with the gas filling to produce electrons, these electrons being drawn to a collector at positive voltage thereby generating a signal that may be related to some characteristic (e.g., energy) of the radiation. Some of the characteristics of the detector are: speed of electron collection which affects the time resolution and spatial resolution for position sensitive detectors, total charge transfer which affects the pulse height of the output signal, and energy resolution which affects identification of specific radiations.

In recent years the most commonly used filling gas is a 90% Ar-10% methane mixture which is designated as P-10. Currently, that gas is a standard against which other gases are evaluated. It has, however, certain deficiencies. For example, the drift velocity is high over only a very narrow E/P (pressure-reduced electron field) range thus putting constraints on the pressure and the collection voltage, and the maximum drift velocity is limiting for some applications.

Thus, there exists a need for providing improved and more efficient gas mixtures for gas-filled particle detectors. The present invention was conceived to meet this need in a manner to be described hereinbelow.

SUMMARY OF THE INVENTION

It is the object of the present invention to provide improved gas mixtures for gas-filled particle detectors wherein faster response can be achieved therefrom.

The above object has been accomplished in the present invention by mixing argon with a gas or mixture of gases having a high electron scattering cross section at energies equal to or greater than 0.5 eV and a small electron scattering cross section at and below about 0.5 eV, selected from $CF_4$ and $C_2H_2$, or a combination thereof at desired concentrations with respect to Ar (the major component) in a manner to be described hereinbelow.

DESCRIPTION OF THE PREFERRED EMBODIMENTS

As pointed out above, a desired essential characteristic of a counting gas is a high speed. This is a function of the gas pressure and the collecting voltage. It is also a function of the electron scattering cross section and the electron mean free path. It was conceived in the present invention that if one gas or a mixture of gases having a large scattering cross section above about 0.5 eV and a relatively small scattering cross section at and below this energy was mixed with one having a low cross section below about 0.5 eV in proportions where the cross section of the mixture is low, a greater speed would result.

The criterion for the high cross section is met by the simple gases $CF_4$ (carbon tetrafluoride) and $C_2H_2$ (acetylene); the low cross section component is argon. Accordingly, mixtures of Ar with $CF_4$ and $C_2H_2$ were prepared and the drift velocity of each measured by conventional techniques. The results of these tests, together with data on prior art gas mixtures, are plotted in FIGS. 1–3 of the drawings.

Figure 1:
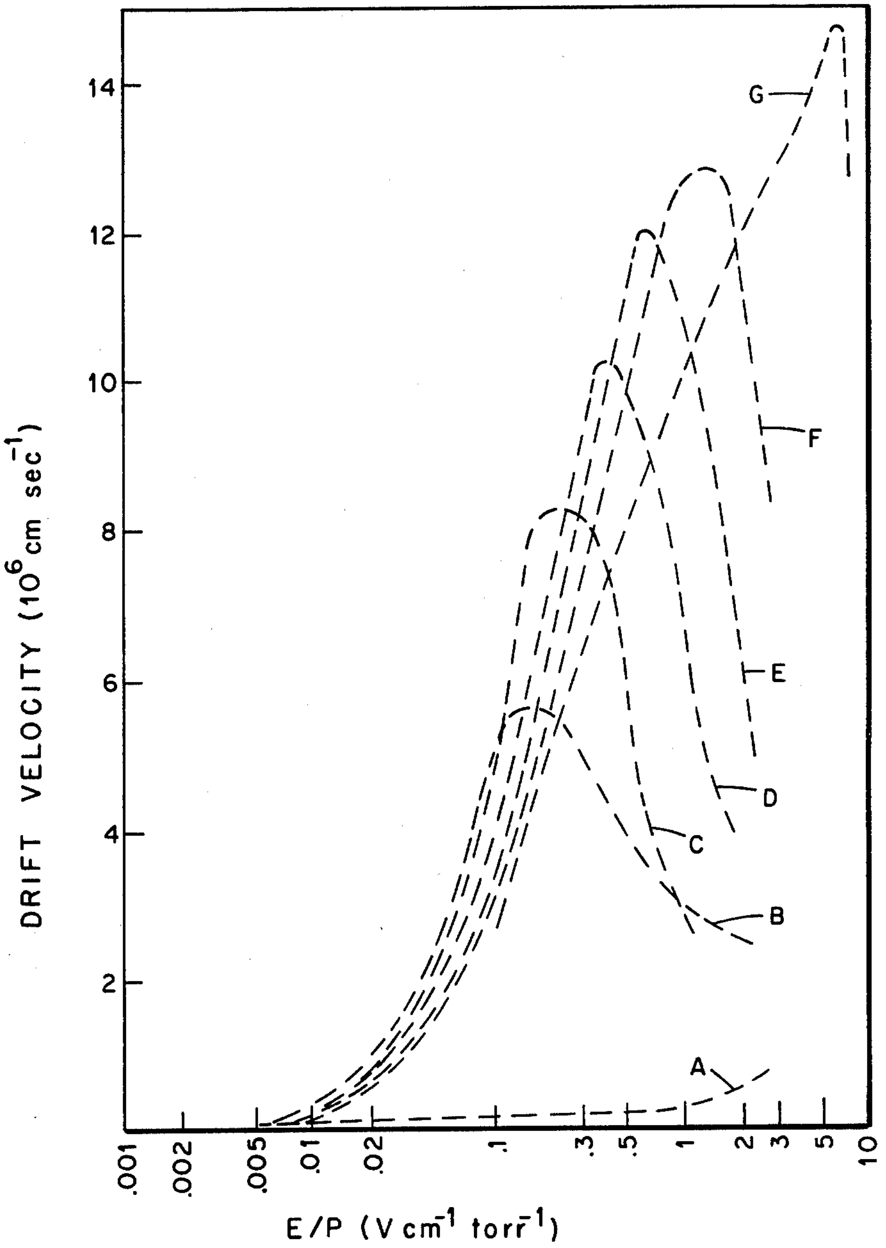
FIG. 1 is a plot of the drift velocity, as a function of E/P, for various gas mixtures showing the superiority of Ar-$CF_4$ mixtures over a P-10 mixture.

Referring first to FIG. 1, a reference curve for P-10 gas (90% Ar-10% methane) is shown as curve B; the Ar drift velocity is plotted as curve A. The maximum drift velocity of P-10 occurs in an E/P range of 0.1 to 0.3 (V $cm^{-1}$ $torr^{-1}$), with the drift velocity decreasing substantially outside of that range. The addition of as little as 1% $CF_4$ to Ar (curve C) increases the drift velocity about 50% above that of P-10 and further enhancement is effected by 5% (curve D), 10% (curve E) and 20% $CF_4$ to Ar (curve F). The enhancement is smaller as additional $CF_4$ is added up to 100% (curve G).

The range of maximum drift velocities for each of these mixtures is shifted to higher E/P values with increasing $CF_4$ concentration. Accordingly, a user may select a composition for a desired maximum drift velocity and then operate at the appropriate E/P value for that maximum. Alternatively, if a specific E/P condition is required, several composition choices are available to achieve a drift velocity at least as large as that of P-10.

Figure 2:
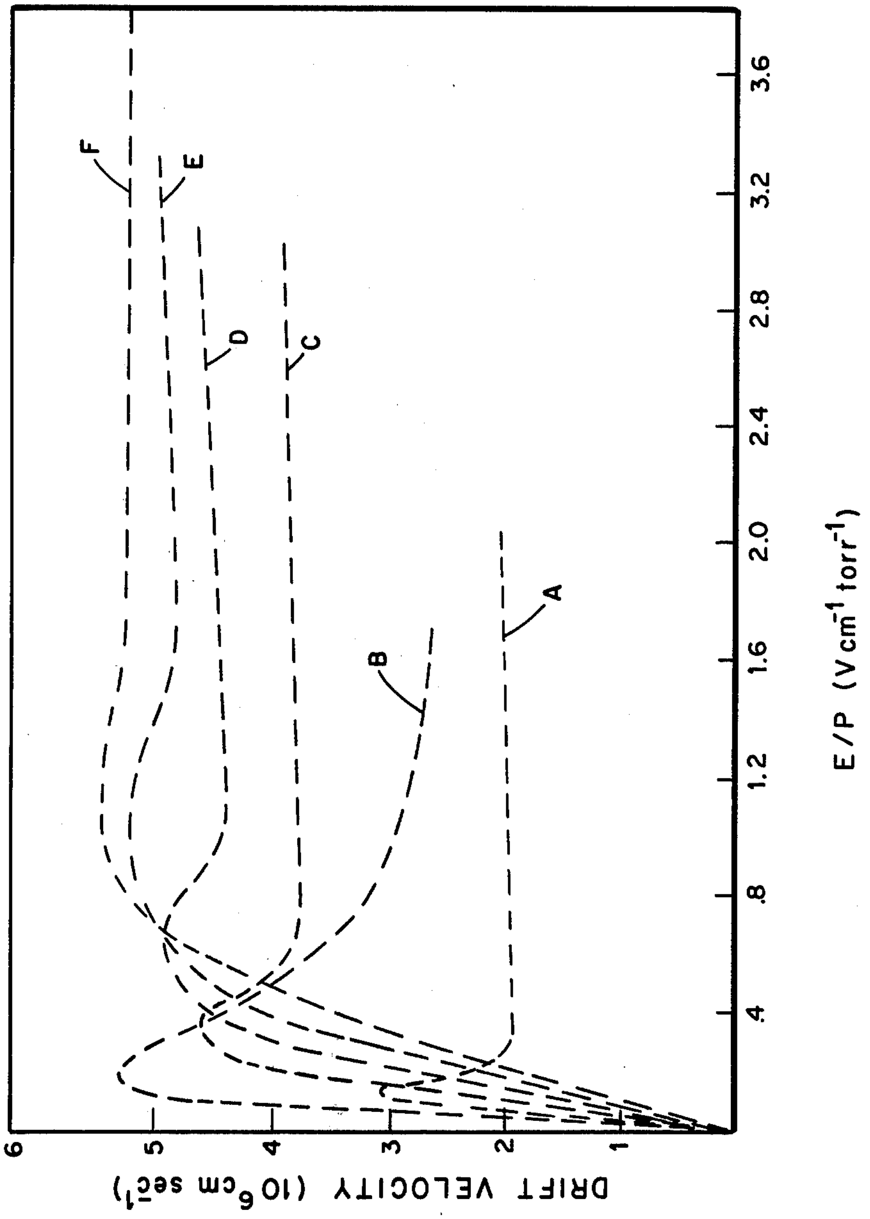
FIG. 2 is a similar plot comparing a P-10 mixture and Ar-$C_2H_2$ mixtures.

The results for Ar-$C_2H_2$ mixtures are plotted in FIG. 2 where they are contrasted with P-10 gas (curve B). The pattern of the results differs from those of the Ar-$CF_4$ mixtures in that an increasing content of $C_2H_2$ gives rise to a drift velocity approximately equaling the maximum for P-10. However, the drift velocity value is nearly constant for any E/P value from about 0.5 to 4 (V $cm^{-1}$ $torr^{-1}$). Thus, for E/P values in this range a relatively high drift velocity can be obtained with $\pm 5\%$ $C_2H_2$ (curve C). In a range of 10–20% $C_2H_2$ (curves D-F), the maximum drift velocity is very near that of the P-10 mixture. When 1% $C_2H_2$ is added to Ar (curve A), the only advantage achieved is a constant drift velocity over a wide E/P range (above about 0.3 V $cm^{-1}$ $torr^{-1}$).

The performance of $CF_4$-Ar and $C_2H_2$-Ar mixtures has each been investigated in a conventional proportional counter using as a source x-rays from $^{55}Fe$. The proportional counter resolution for several concentrations of $CF_4$ or $C_2H_2$ in Ar was measured for a number of voltages applied to the anode (central wire). The percent energy resolution is defined as the full width at half maximum of the peak divided by the position in energy of the peak. For a 10% $CF_4$-90% Ar mixture, the percent resolution is approximately three to four times greater than that for the P-10 mixture. This poorer resolution for the $CF_4$-Ar mixtures is due to the fact that $CF_4$ attaches electrons, probably by dissociative electron attachment of $CF_4$ producing $F^-$. The percent resolution for $C_2H_2$-Ar mixtures, on the other hand, is approximately the same (and it could, in fact, be better) as that for P-10 mixtures up to 30% $C_2H_2$ in Ar.

From the above discussion it can be seen that $CF_4$-Ar mixtures have the advantage of enhanced drift velocity but at the expense of energy resolutions, and $C_2H_2$-Ar mixtures have drift velocities slightly greater than those for P-10 mixtures (but over a wider E/P range) and no appreciable change in energy resolution with respect to P-10 mixtures. Thus, it was conceived that both advantages of $CF_4$ and $C_2H_2$ as additions to Ar could be realized in tertiary gas mixtures.

Figure 3:
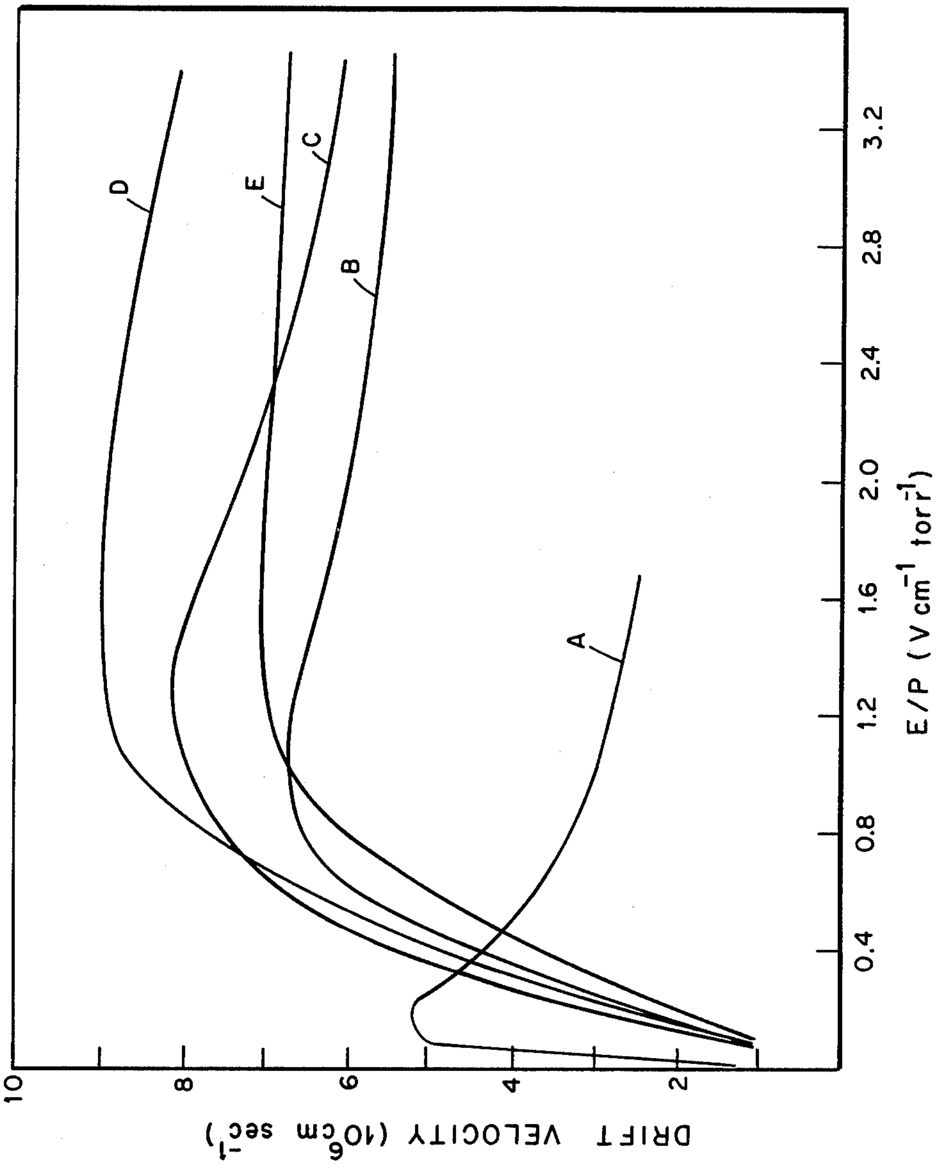
FIG. 3 is a similar plot comparing a P-10 mixture and Ar-$CF_4$-$C_2H_2$ mixtures.

The drift velocities for $C_2H_2$-$CF_4$-Ar mixtures are plotted in FIG. 3 as a function of E/P and are compared with those for P-10 (curve A). The results plotted are for mixtures; B, 87% Ar-10% $C_2H_2$-3% $CF_4$; C, 85% Ar-10% $C_2H_2$-5% $CF_4$; D, 80% Ar-10% $C_2H_2$-10% $CF_4$; and E, 80% Ar-15% $C_2H_2$-5% $CF_4$. These tertiary gas mixtures exhibit drift velocities up to twice that for P-10 and sustain this higher drift velocity over a large range of E/P. Additionally, the proportional counter energy resolution for these tertiary mixtures is only slightly (4–8%) higher than that for P–10.

From the results illustrated in FIGS. 1–3, as discussed above, it can readily be seen that the drift velocity of various gas mixtures comprising argon and varying amounts of $CF_4$ and/or $C_2H_2$ is substantially improved over that achieved by the prior art gas mixture P-10, wherein the use of such improved gas mixtures in conventional proportional counters results in faster response thereof.

This invention has been described by way of illustration rather than by limitation and it should be apparent that it is equally applicable in fields other than those described.

What is claimed is:

1. An improved tertiary gas mixture for use in gas-filled particle detectors comprising $CF_4$, $C_2H_2$ and argon with the concentration of said $CF_4$ in said mixture being a selected amount in the range from 3–10% and with the concentration of said $C_2H_2$ in said mixture being a selected amount in the range from 10–15%.

2. The gas mixture set forth in claim 1, wherein the selected amount of said $CF_4$ is 3%, and the selected amount of said $C_2H_2$ is 10%.

3. The gas mixture set forth in claim 1, wherein the selected amount of said $CF_4$ is 5%, and the selected amount of said $C_2H_2$ is 10%.

4. The gas mixture set forth in claim 1, wherein the selected amount of said $CF_4$ is 10%, and the selected amount of said $C_2H_2$ is 10%.

5. The gas mixture set forth in claim 1, wherein the selected amount of said $CF_4$ is 5%, and the selected amount of said $C_2H_2$ is 15%.

* * * * *